(12) United States Patent
Klimov

(10) Patent No.: US 8,091,139 B2
(45) Date of Patent: Jan. 3, 2012

(54) SYSTEM AND METHOD FOR MASKING ARBITRARY BOOLEAN FUNCTIONS

(75) Inventor: Alexander Klimov, Hadera (IL)

(73) Assignee: Discretix Technologies Ltd., Kfar Netter (IL)

( * ) Notice: Subject to any disclaimer, the term of this patent is extended or adjusted under 35 U.S.C. 154(b) by 1035 days.

(21) Appl. No.: 11/933,666

(22) Filed: Nov. 1, 2007

(65) Prior Publication Data
US 2009/0116644 A1 May 7, 2009

(51) Int. Cl.
*G06F 21/02* (2006.01)
(52) U.S. Cl. ............ 726/26; 380/252; 380/287; 726/24
(58) Field of Classification Search .......... 380/28, 380/252; 726/24, 26
See application file for complete search history.

(56) References Cited

U.S. PATENT DOCUMENTS

| | | | |
|---|---|---|---|
| 7,907,722 B2* | 3/2011 | Timmermans | 380/28 |
| 2002/0029346 A1 | 3/2002 | Pezeshki et al. | |
| 2005/0184760 A1* | 8/2005 | Trichina et al. | 326/104 |
| 2006/0120527 A1* | 6/2006 | Baek | 380/252 |
| 2006/0200514 A1* | 9/2006 | Fischer et al. | 708/446 |
| 2009/0092245 A1* | 4/2009 | Fumaroli et al. | 380/28 |
| 2009/0112896 A1* | 4/2009 | Golic | 707/101 |

FOREIGN PATENT DOCUMENTS

| | | |
|---|---|---|
| EP | 1 615 098 | 1/2006 |
| GB | 2 345 229 | 6/2000 |
| WO | WO 00/08542 | 2/2000 |
| WO | WO 01/08012 * | 2/2001 |

OTHER PUBLICATIONS

International Search Report for EP 08 25 35 91 dated Apr. 9, 2009.
Cache Based Remote Timing Attack On The AES, O. Acizmez, W. Schindler and C.K. Koz, Feb. 7, 2007.
Successfully Attacking masking AES Hardware Implementations, Stefan Mangard, Norbert Pramstaller, and Elisabeth Oswald, Institute for Applied Information Processing and Communciations (IAIK) Graz University of Technology, Sep. 19, 2005.
Combinational Logic Design for AES Subbyte Transformation On Masked Data, Elena Trichina, 2003.
Enhanced DES Implementation Secure Against High-Order Differential Power Analysis in Smartcards, Jiqiang Lv and Yongfei Han, Proceedings ACISP'05—The tenth Australian Conference on Information Security and Privacy, Brisbane, Austrialia, C. Boyd and J.M. Gonzalez nieto, vol. 3574 of lecture Notes in Computer Science, pp. 195-206, Springer-verlag, 2005.
Masked Dual-Rail Pre-Charge Logic: DPA-Resistance Without Routing Constraints, Thomas Popp and Stefan Mangard, 2005.
Random Switching Logic: A Countermeasure Against DPA Based On Transition Probability, Daisuke Suzuki, Minoru Saeki, and Tetsuya Ichikawa, 2004.
Spy Catcher: The Candid Autobiography of a Senior Intelligence Officer, Peter Wright, 1987.
European Search Report for EP 08 25 3591 dated Apr. 9, 2009.

* cited by examiner

*Primary Examiner* — Vivek Srivastava
*Assistant Examiner* — Thomas Lauzon
(74) *Attorney, Agent, or Firm* — Eitan Mehulal Law Group

(57) ABSTRACT

A method is disclosed for protecting secret data, which is intended to be processed by an original function, from being deduced by a side-channel attack upon execution of the original function by an electronic computing device. The method includes creating hardware circuitry which replaces the original function with one or more pairs of replacement functions, by applying a predetermined masking algorithm which performs a recursive protection process. Further disclosed is an apparatus for protecting secret data, which is intended to be processed by an original function, from being deduced by a side-channel attack upon execution of the original function by an electronic computing device.

15 Claims, 8 Drawing Sheets

US 8,091,139 B2

SYSTEM AND METHOD FOR MASKING ARBITRARY BOOLEAN FUNCTIONS

FIELD OF THE INVENTION

The present invention relates to data security and masking of Boolean functions.

BACKGROUND OF THE INVENTION

When secret data, such as, encrypted or otherwise protected information, is processed by a computing device, the processed results may be used to deduce the secret data, for example, by side-channel attacks, cryptanalysis, or other decryption mechanisms. For example, decryption devices may read, acquire, or measure the auxiliary or side-channel results of the secret data, which may include, for example, acoustic side-channel data and/or variation of their power consumption and electro-magnetic (EM) radiation For example, such attacks pertaining to mechanical rotary encryption machines may be described, for example, in Peter Wright, *Spycatcher The Candid Autobiography of a Senior Intelligence Officer.*

To counteract such cryptanalysis or side-channel attacks, additional protective countermeasures may be applied, for example, including, reducing the signal-to-noise ratio of the processed secret data (e.g., by applying noise generators, filters on power lines, etc.), isolating or protecting intermediate results of processing the secret data (e.g., of a statistical distribution thereof) to be independent or unconnected to the secret data. Such protective countermeasures may be achieved on a physical (e.g., or circuit) level or on an algorithmic (e.g., or logical) level Circuit-level countermeasures, may be described, for example, in T. Popp and S. Mangard, *Masked Dual-Rail Pre-Charge Logic DPA-Resistance without Routing Constraints* and in D. Suzuki, M. Saeki and T. Ichikawa, *Random Switching Logic: A Countermeasure against DPA based on Transition Probability* Circuit-level countermeasures typically use a customized or semi-customized workflow. For example, when a circuit is synthesized, each standard cell may be replaced with one or more cells, each having a power consumption (e.g., and/or EM radiation) that may be substantially independent or unconnected with the data processed by the cell.

Algorithmic level countermeasures may be described, for example, in E. Trichina, *Combinational Logic Design for AES SubByte Transformation on Masked Data*, which may preemptively isolate the secret data and the processed resultant data thereof, for example, by making each intermediate result of the original algorithm statistically independent of the processed secret data.

However, circuit-level countermeasures may result in large latency and area cost and algorithmic countermeasures may betray the secrets data by exposing the additional (e g., unforeseen) intermediate results or physical artifacts of circuit computations of the secret data. Such exposure may result from what is referred to, for example, as the logical-physical gap, which is described, for example, in S. Mangard, N. Pramstaller and E. Oswald, *Successfully Attacking Masked AES Hardware Implementations* Furthermore, algorithmic countermeasures may include undesirable ad-hoc implementations. For example, methods described in *Combinational Logic Design for AES SubByte Transformation on Masked Data* may depend on a special ad-hoc structure of advanced encryption standard (AES) substitution box (S-box) transformations (e.g., an inversion in GF (256) represented as a set of operations in GF (16)). When the encryption operations do not have a useful structure (e.g., using Boolean functions having well-defined statistical properties, that are not necessarily correlated with operations system) the algorithmic countermeasures may have a substantially large logical-physical gap. For example, the algorithmic countermeasures may only mask values that depend on a substantially small number of secret data or key bits (e.g., which may control the operation of a cryptographic algorithm or mechanism) For example, the mechanisms in J. Lv and Y. Han, *Enhanced DES Implementation Secure against High-Order Differential Power Analysis in Smartcards* shows that for a function implemented as a look-up table, access to different entries in the table may be indistinguishable. However, such methods may be disputed in O. Acicmez, W. Schindler and C. K. Koc, *Cache Based Remote Timing Attack on the AES.*

A need exists to protect secret data from side-channel attacks in a more secure manner

BRIEF DESCRIPTION OF THE INVENTION

The subject matter regarded as the invention is particularly pointed out and distinctly claimed in the concluding portion of the specification. The invention, however, both as to organization and method of operation, together with objects, features and advantages thereof; may best be understood by reference to the following detailed description when read with the accompanied drawings in which:

FIG. 1 is a schematic illustration of a computing device according to an embodiment of the invention;

FIGS. 2, 3, and 4, are schematic illustrations of algorithm level mechanisms for protecting secret data against side-channel attacks according to an embodiment of the invention.

Figure 8:
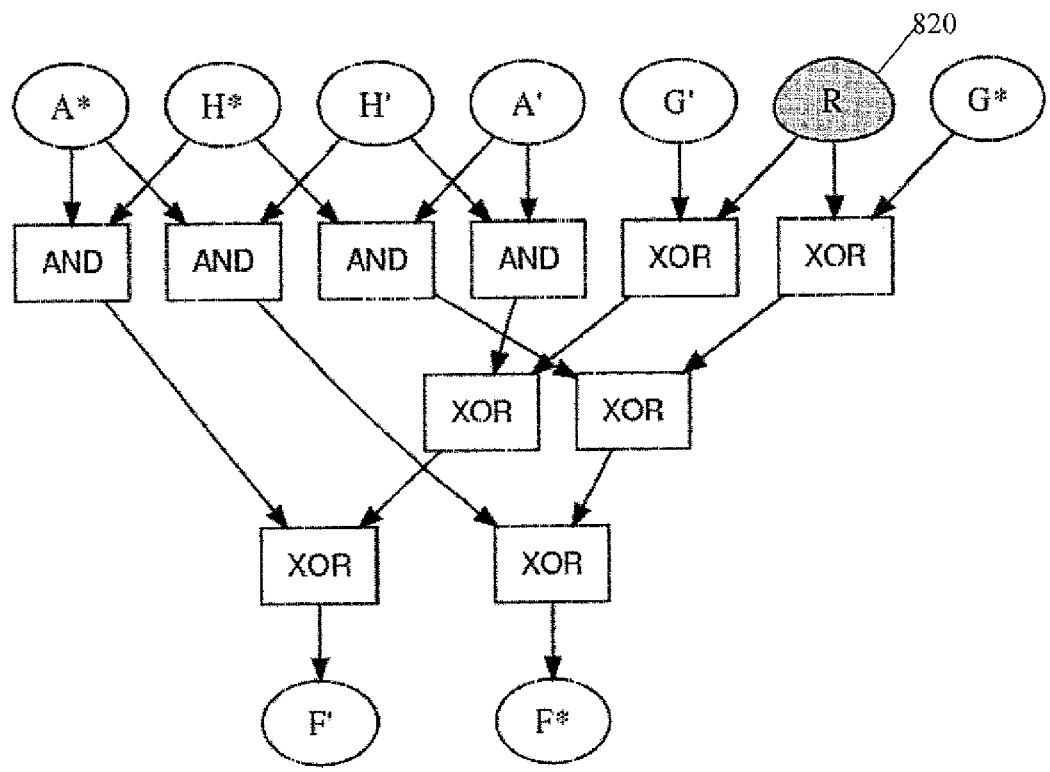
Figure 9:
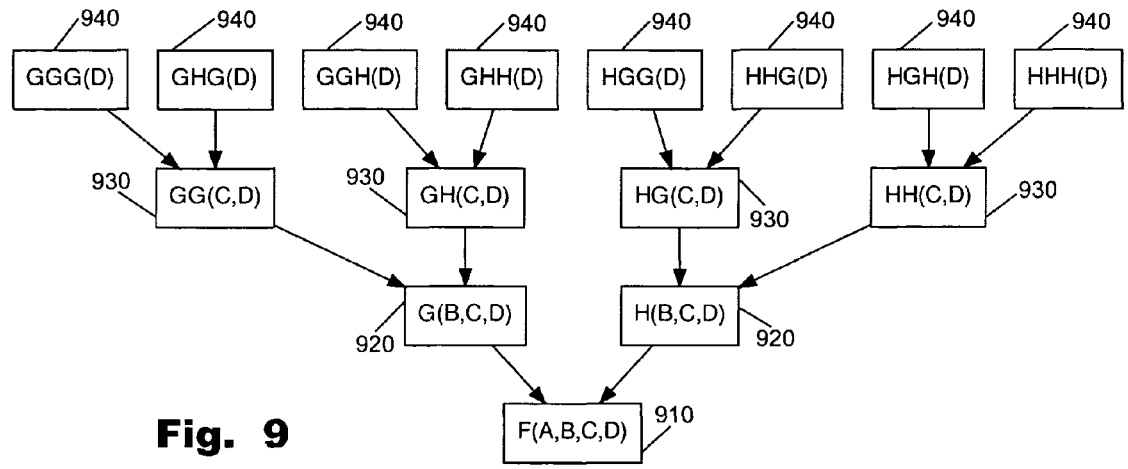
Figure 10:
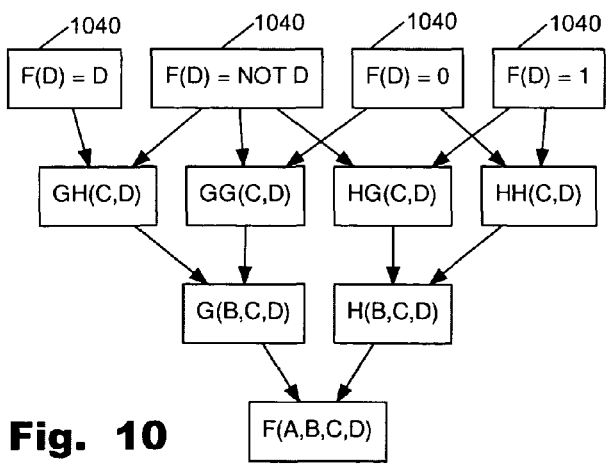
Figure 11:
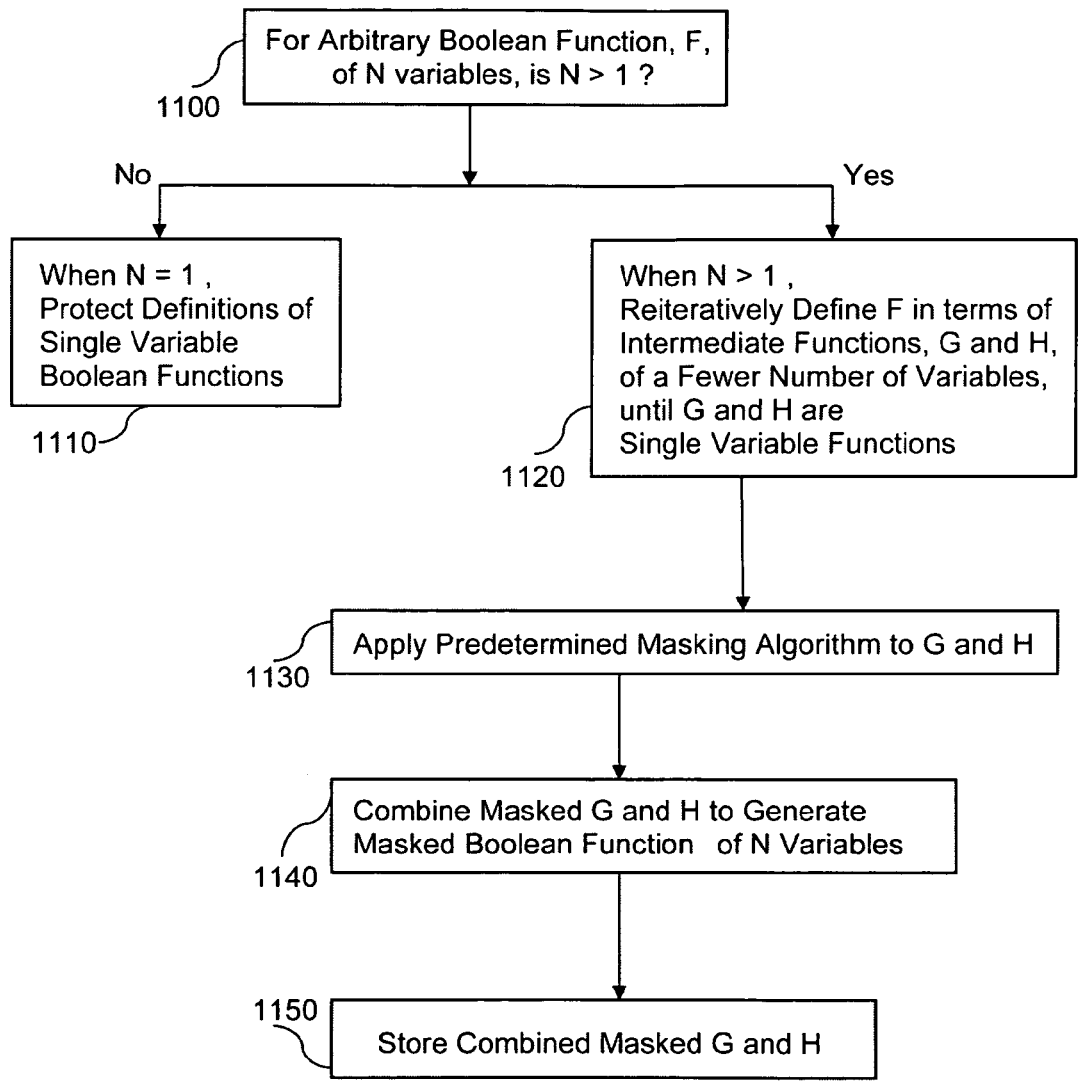

FIG. 8 is a schematic illustration of a protected definitions for an arbitrary Boolean function, F, and transformations thereof F'; F*, which may be defined in terms of intermediate functions, G and H, and transformations thereof, G'; G* and H'; H*, respectively, according to an embodiment of the invention;

FIGS. 9 and 10 are schematic illustrations of protected definitions of an arbitrary Boolean function, F, having a number of variables (e g, M) where the definition includes a minimal number of intermediate functions, G and X, having less than the number of variables, M, according to an embodiment of the invention; and FIG. 11 is a flow chart of a method according to an embodiment of the invention.

It will be appreciated that for simplicity and clarity of illustration, elements shown in the drawings have not necessarily been drawn accurately or to scale. For example, the dimensions of some of the elements may be exaggerated relative to other elements for clarity or several physical components included in one functional block or element. Further, where considered appropriate, reference numerals may be repeated among the drawings to indicate corresponding or analogous elements Moreover, some of the blocks depicted in the drawings may be combined into a single function.

SUMMARY

Figure 4:
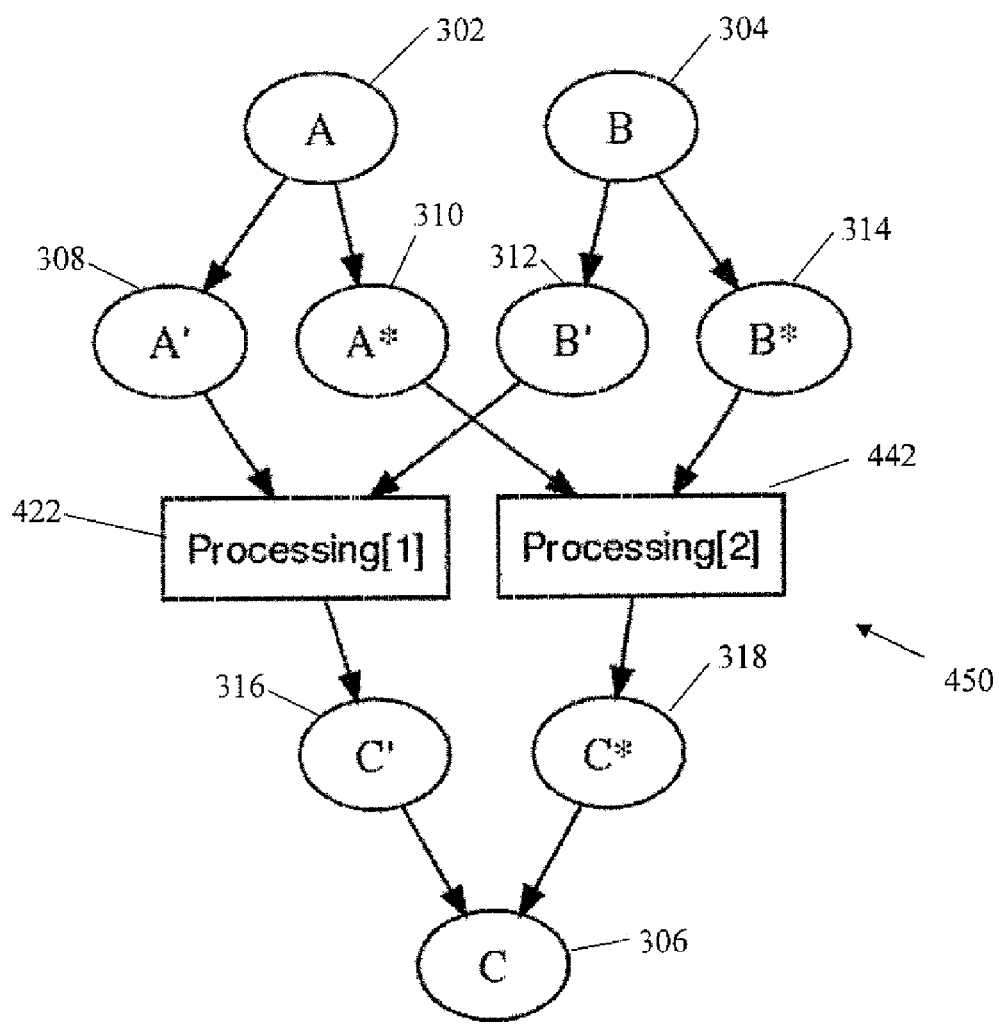
Figure 5:
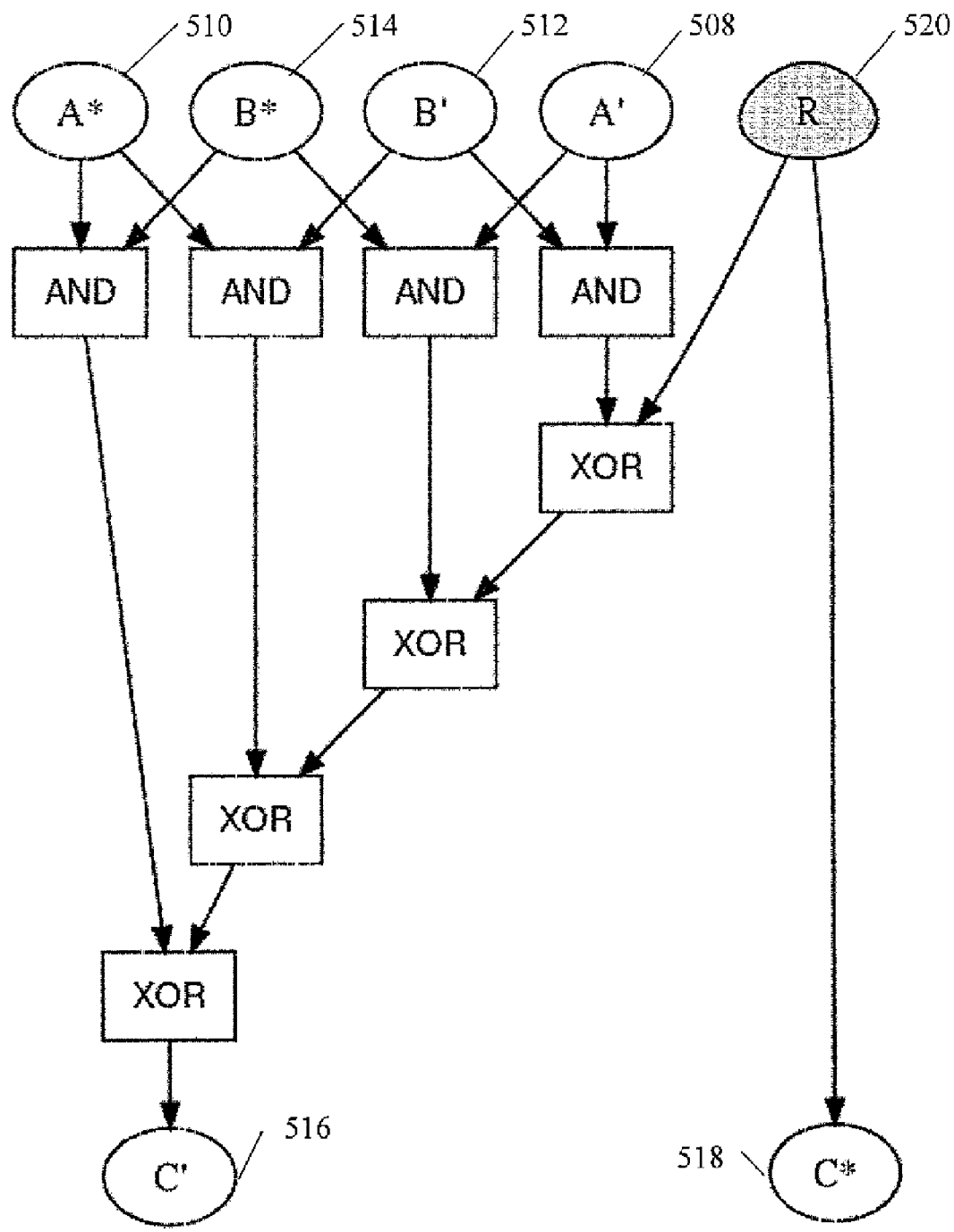
FIG. 5 is a schematic illustration of masks applied to protect non-linear connections between secret data and the processed data thereof against side-channel attacks according to an embodiment of the invention.

Reference is made to FIG. 5, which schematically illustrates masks applied to protect non-linear connections between secret data and the processed data thereof against side-channel attacks according to an embodiment of the invention. For example, when secret data (e.g.) variables A and B) and the resultant processed data thereof (e.g., intermediate variables A' 508; A* 510 and B' 512; B* 514, respectively) are connected or defined by a relationship including non-linear functions (e.g., in Galois Field GF(2), the relationships may be replaced or broken down into linear functions. For example, methods for replacing non-linear functions with linear functions may be described, for example, in E. Trichina, *Combinational Logic Design for AES SubByte Transformation on Masked Data*. The resulting linear functions may then be protected from side-channel attacks, for example, by additive and/or multiplicative masks, for example, as described in reference to FIGS. 2, 3, and 4.

DETAILED DESCRIPTION OF THE INVENTION

In the following detailed description, numerous specific details are set forth in order to provide a thorough understanding of the invention However it wilt be understood by those skilled in the art that the present invention may be practiced without these specific details In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

The following inventive embodiments may be used in a variety of applications including transmitters and receivers of a radio system, although the present invention is not limited in this respect. Radio systems specifically included within the scope of the present invention include, but are not limited to, network interface cards (NICs), network adaptors, mobile stations, base stations, access points (APs), gateways, bridges, hubs and cellular radiotelephones, satellite systems, personal communication systems (PCS), two-way radio systems, two-way pagers, personal computers (PCs) and related peripherals, personal digital assistants (PDAs), personal computing accessories and all existing and future arising computing systems which may be related in nature and to which the principles of the inventive embodiments could be suitably applied.

Figure 1:
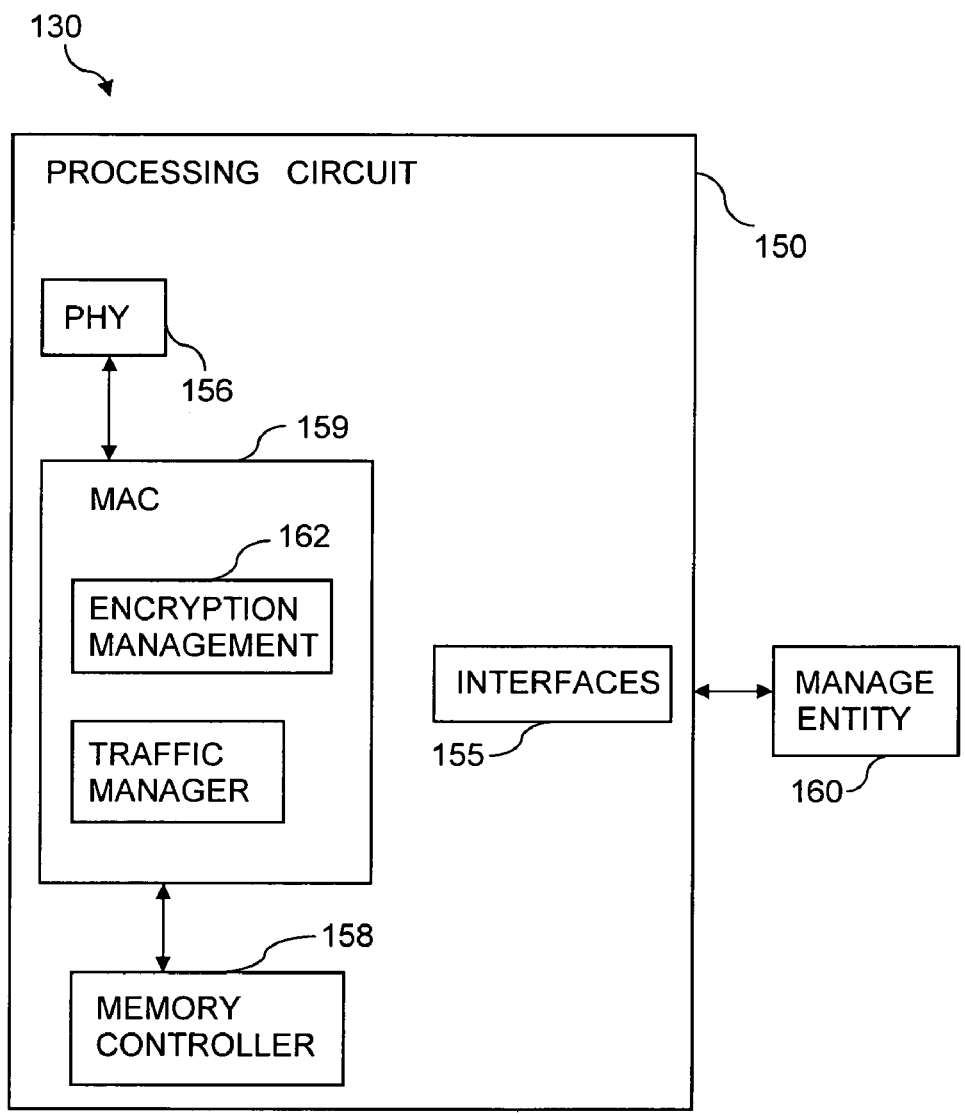

Reference is made to FIG. 1, which schematically illustrates a computing device 130 according to an embodiment of the invention For example, computing device 130 may be a terminal, device, apparatus, or node for securely computing, processing, and/or communicating with other terminals, devices, apparatuses or nodes (e.g., in a wireless network or other communication forum) Computing device 130 may include a controller or processing circuit 150 including logic (e.g., including hard circuitry, processor and software, or a combination thereof) to protect secret data or processed data thereof used by computing device 130 (e.g., using circuit-level or algorithmic level countermeasures) to counter side-channel attacks according to embodiments of the invention Embodiments of the invention may provide an encryption management system 162 to protect an arbitrary function (e.g., at least in part defining a relationship between secret data and processed data thereof) for an arbitrary number of variables, N+1, used in computing device 130 from side-channel attacks Embodiments of the invention may include, in computing device 130, protecting a definition of the arbitrary function (e g., such as a Boolean function) for an arbitrary number of variables, M, protecting a definition of the arbitrary function for a fixed number of variables, P, and protecting a definition of the arbitrary function for a number of variables, N. For example, M, P, and N may be natural numbers.

Processing circuit 150 may include a baseband or physical layer (PHY) processing circuit 156 for PHY link layer. Processing circuit 150 may include, for example, a processing circuit 159 for medium access control (MAC)/data link layer processing. Processing circuit 150 may include a memory controller 158 for communicating with processing circuit 159 and/or a base station management entity 160, for example, via interfaces 155.

In some embodiments of the present invention, PRY processing circuit 156 may include or may be in communication with an encryption management system 162, in combination with additional circuitry such as a buffet memory, to encrypt and/or protect secret data and/or the processed data thereof, functions, connections, and/or relationships therebetween, and/or definitions used therewith, as in embodiments described herein. Alternatively or in addition, MAC processing circuit 159 may share processing for certain of these functions or perform these processes independent of PHY processing circuit 156. In some embodiments, MAC and PHY processing may be integrated into a single circuit if desired.

Computing device 130 may be, for example, a base station, an access point, a device, a terminal, a node, a subscriber station, a hybrid coordinator, a wireless router, a NIC and/or network adaptor for computing devices, a mobile station or other device suitable to implement the inventive methods, protocols and/or architectures described herein. Accordingly, functions and/or specific configurations of computing device 130 described herein, may be included or omitted in various embodiments of computing device 130, as suitably desired.

The components and features of computing device 130 may be implemented using any combination of discrete circuitry, application specific integrated circuits (ASICs), logic gates and/or single chip architectures. Further, the features of computing device 130 may be implemented using microcontroller's, programmable logic arrays and/or microprocessors or any combination of the foregoing where suitably appropriate. It is noted that hardware, firmware and/or software elements may be collectively or individually referred to herein as "logic" or "circuit."

It should be appreciated that the example computing device 130 shown in the block diagram of FIG. 1 may represent one functionally descriptive example of many potential implementations Accordingly, division, omission or inclusion of block functions depicted in the accompanying figures does not infer that the hardware components, circuits, software and/or elements for implementing these functions would be necessarily be divided, omitted, or included in embodiments of the present invention.

Figure 2:
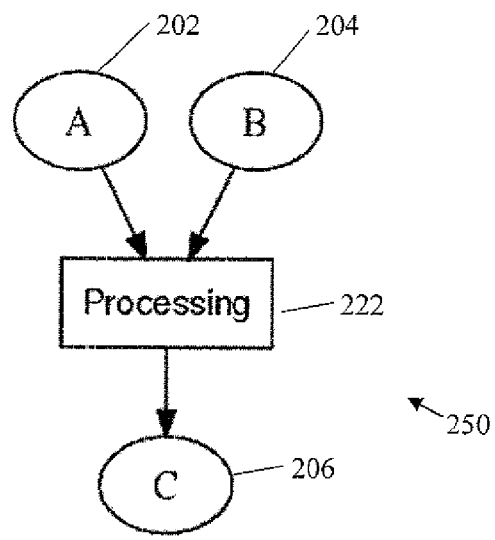
Figure 3:
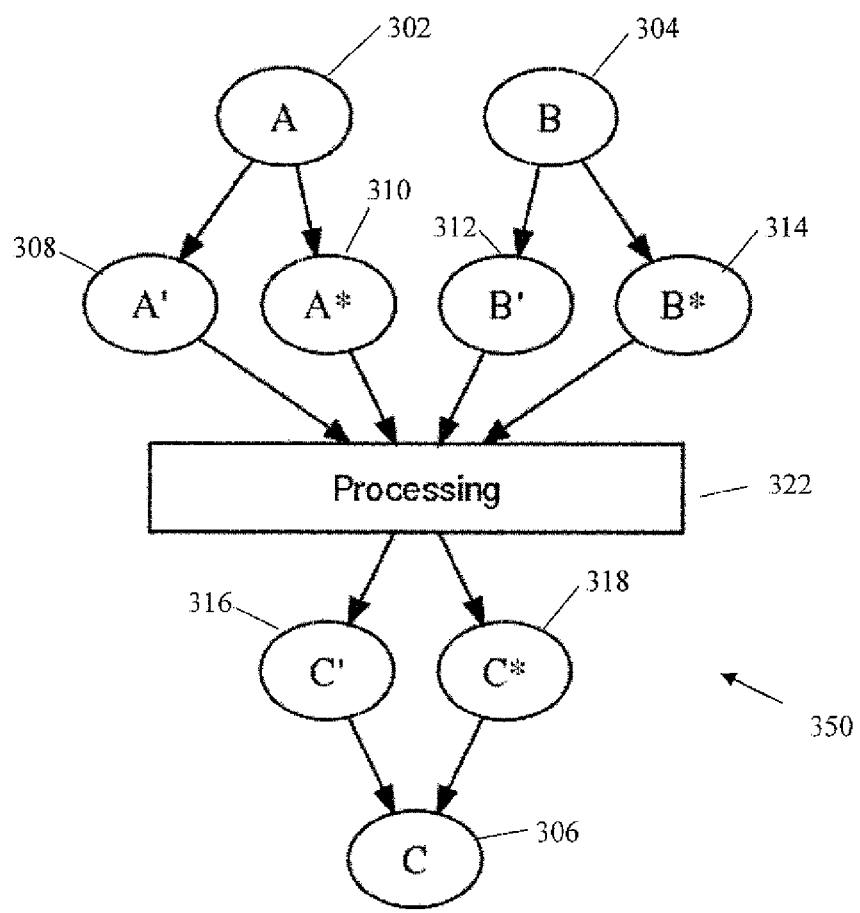

Reference is made to FIGS. 2, 3, and 4, which schematically illustrate algorithm level mechanisms for protecting secret data against side-channel attacks according to an embodiment of the invention. It may be appreciated that variables described in the figures, (e.g., including, A, A', A*, B, B', B*, C, C', and/or C*) may be used according to descriptions of variables denoted by the same and/or corresponding letters and/or symbols in other figures In FIG. 2, a circuit 250 may include a processing unit 222 for processing secret data including, for example, a variable A 202 and a variable B 204, for example, to generate resultant data, including for example, a variable C 206

In FIG. 3, a circuit 350 including a processing unit 322 may implement algorithm level countermeasures against side-channel attacks, for example, by protecting and/or masking connections between secret data and the intermediate data generated from the processing thereof. For example, circuit 350 may include a processing unit 322 for processing secret data including, for example, a variable A 302 and a variable B 304, for example, to generate intermediate variables A' 308, A* 310, B' 312, and B* 314, for example, by splitting, transforming, replacing or modifying the secret data. Processing unit 322 may process intermediate variables A' 308, A* 310, B' 312, and B* 314, to generate intermediate resultant variables C' 316 and C* 318. Processing unit 322 may process (e g, or combine) intermediate resultant variables C' 316 and C* 318 to generate a final resultant variable C 306.

Depending on the type of processing operations executed for generating intermediate variables A' 308, A* 310, B' 312, and B* 314, side-channel attacks and/or decryption mechanisms may connect the intermediate variables with the variables (e.g., A 302 and/or B 304) from which they where generated, thereby revealing secret data. To prevent the side-channel attacks from connecting the intermediate variables with secret data variables, processing unit 322 may protect the connection by applying masks to the connections, for example, depending on type of connection. For example, when the intermediate variables and secret data variables are connected or defined by a relationship including linear functions (e.g., in Galois Field (GF)(2)), the connection may be protected, for example, by an additive mask, described by equation (1).

$$A = A' \text{ XOR } A^*. \tag{1}$$

For example, when the intermediate variables and secret data variables are connected by an inversion (e.g., in a finite field), the connection may be protected, for example, by a multiplicative mask, described by equation (2):

$$A = A' \text{ TIMES } A^*. \tag{2}$$

Other connections, relationships, and/or definitions may be used. For example, other finite field may include Galois Field, for example, $GF(p^n)$, where n may be a natural number and p may be a prime number.

In FIG. 4, a circuit 450 may include multiple processing units for optimizing algorithm level countermeasures against side-channel attacks. In some embodiments, when the connections between intermediate variables A' 308, A* 310, B' 312, and B* 314, and secret variables A 302 and B 304, are defined, for example, according to the operations of a processing unit, then the processing unit, for example, using four intermediate variables 308, 310, 312, and 314 may have a size or area, for example, approximately two times the size of processing unit 322, as described in reference to FIG. 3 (e.g., using two secret variables 302 and 304) For example, when substantially every computation of variables by processing unit 322 is linear and additive masks are used, processing unit 322 may be replaced by two processing units, such as processing units 422 and 442, as shown in FIG. 4.

In some embodiments, non-linear functions may include more complicated relationships than relationships defined by linear functions.

For example, when secret variables A and B and variables A' 508; A* 510 and B' 512; B* 514, respectively processed therefrom, or variable C' 516 and C* 518, respectively generated therefrom, may be connected by non-linear functions or relationships, an additional (e.g., random) variable R 520 may be used to define the connections using linear equations. A processing unit may then protect the linear connection by applying, for example, the following masks, described by equations (3) and (4):

$$C' = R \text{ XOR}(A' \text{ AND } B') \text{XOR}(A' \text{ AND } B^*) \text{XOR}(A^* \\ \text{AND } B') \text{XOR}(A^* \text{ AND } B^*) \tag{3}$$

$$C^* = R, \tag{4}$$

where a single AND gate may be replaced with (e.g., four) AND gates and (e.g. four) XOR gates.

Figure 6:
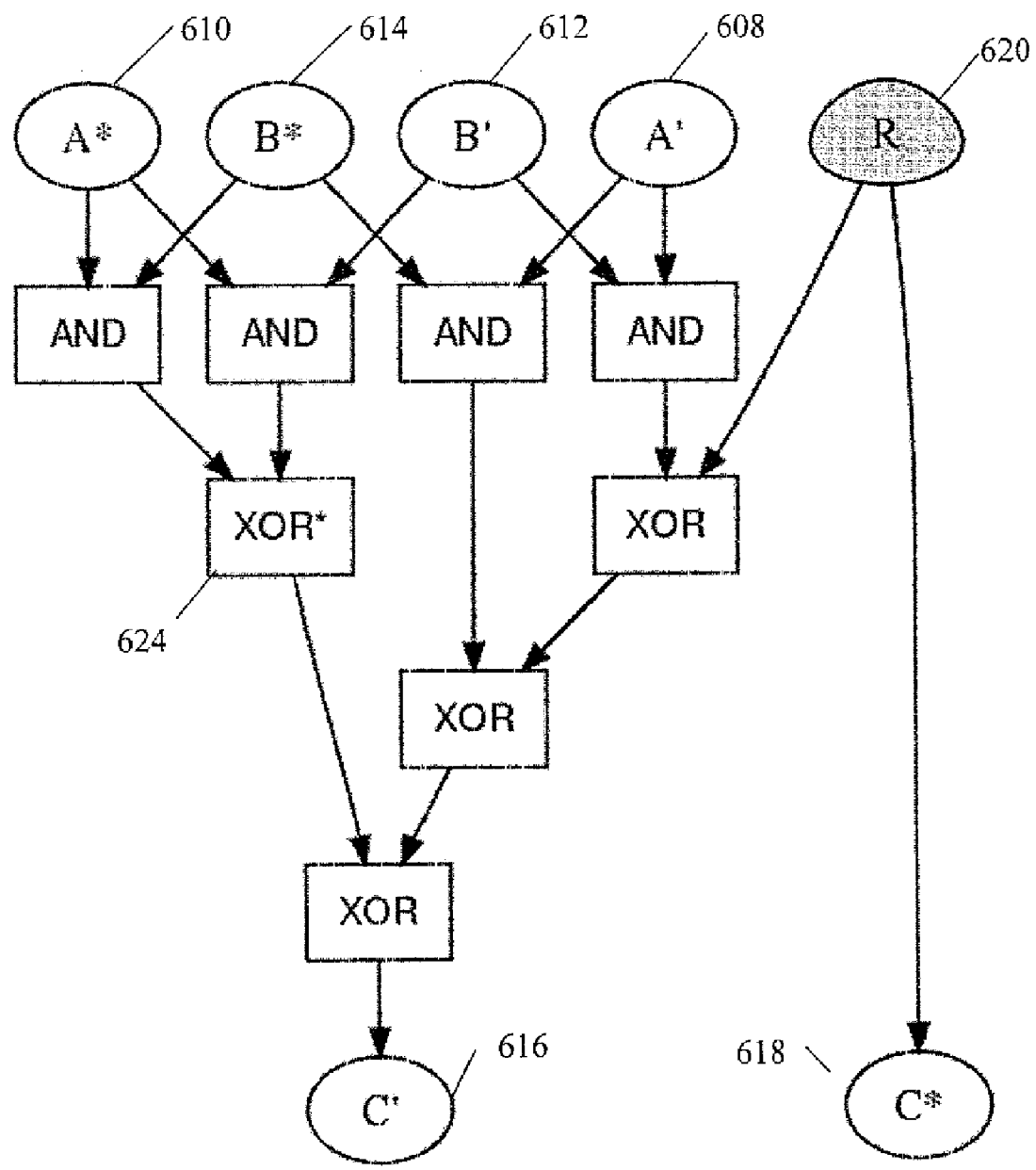
FIG. 6 is a schematic illustration of masks that may be vulnerable to side-channel attacks according to an embodiment of the invention.

Reference is made to FIG. 6, which schematically illustrates masks that may be vulnerable to side-channel attacks according to an embodiment of the invention. For example, the intermediate result calculated by the cell marked XOR* 624 may be used, for example, by a side-channel attack mechanism, to reveal secret data B, for example, according to equation (5):

$$(A^* \text{ AND } B^*) \text{XOR}(A^* \text{ AND } B') = A^* \text{ AND } (B^* \text{XOR} \\ B') A^* \text{ AND } B \tag{5}$$

When the relationship between the secret data and processed data thereof (e.g., variables A' 608, A* 610, B' 612, B* 614) is substantially simple (e.g., the connection is defined by a substantially short path), the probability of predicting the relationship (e.g., or path) is substantially high. For example, the decoding of secret variables A and B may be achieved by probabilistic mechanisms, such as for example, by synthesis tools. Thus, it may be desirable to use substantially complex relationships to define connections between secret data and processed data thereof.

According to embodiments of the invention, connections between secret data and processed data thereof may be defined, for example, using Boolean functions. Embodiments of the invention may protect an arbitrary Boolean function, for example, S-box of DES. A system according to embodiment of the present invention may use additive masking, for example, applied recursively to the functions.

Embodiments of the invention may initially protect an arbitrary function, for example, having one input variable Embodiments of the invention may protect an arbitrary function having, for example, N+1, variables, for example, using protected functions having N variables. Embodiments of the invention may reiteratively apply the protected definition (e.g., initially applied to the arbitrary function having one variable) for protecting the arbitrary function, for example, having an increasing number of variables. Thus, by inductive reasoning, embodiments of the invention may protect the arbitrary function having any or an arbitrary number of variables.

Four (e.g., unique) Boolean functions (e.g., F(X)) having one input variable, X, may be defined, for example, by equations (6) (9);

$$F(X)=0; \quad (6)$$

$$F(X)=1; \quad (7)$$

$$F(X)=X; \quad (8)$$

and $$F(X)=\text{NOT } X \quad (9)$$

In some embodiments, protecting an arbitrary Boolean function having one input variable may include protecting each of these four Boolean functions, according to embodiments of the invention.

In some embodiments, an input variable, X, of the Boolean function F(X) may be, for example, transformed to or masked by, for example, two variables X' and X*, defined according to equation (10):

$$X=X'\text{XOR } X^*. \quad (10)$$

Likewise, the Boolean function F(X)=0 may be, for example, transformed to or masked by, for example, two functions F' and F*, defined according to equation (11):

$$F'\text{XOR } F^*=0, \quad (11)$$

where, for example, $$F'(X',X^*)=X' \quad (12)$$

$$F^*(X',X^*)=X' \quad (13)$$

In one embodiment, the functions defined by equations (6)-(9) may be represented, for example, by equations (14)-(17):

$$F(X)=0 => F'(X',X^*)=X', F^*(X',X^*)=X'; \quad (14)$$

$$F(X)=1 => F'(X',X^*)=X', F^*(X',X^*)=\text{NOT } X'; \quad (15)$$

$$F(X)=X => F'(X',X^*)=X', F^*(X',X^*)=X^*; \quad (16)$$

and $$F(X)=\text{NOT } X => F'(X',X^*)=X', F^*(X',X^*)=\text{NOT } X^* \quad (17)$$

In some embodiments, the functions defined by equations (14)-(17) may be protected single variable Boolean functions.

Figure 7:
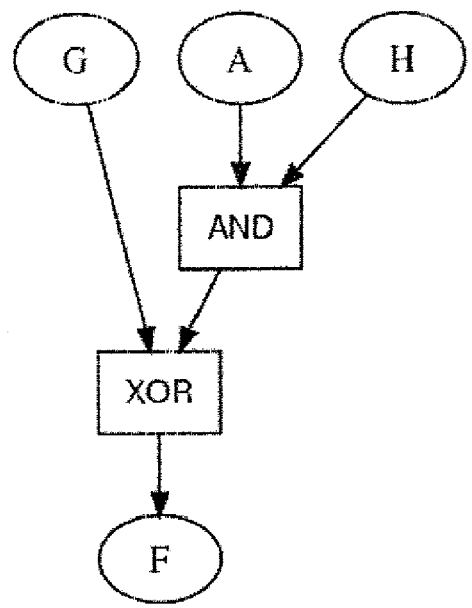
FIG. 7 is a schematic illustration of a protected definition for an arbitrary Boolean function, F, having an arbitrary number of variables, M, according to an embodiment of the invention.

Reference is made to FIG. 7, which schematically illustrates a protected definition for an arbitrary Boolean function, F, having an arbitrary number of variables, M, according to an embodiment of the invention.

In FIG. 7 a definition for the arbitrary functions F having an arbitrary number, M, of variables (e.g., A, B, ..., Z) may be defined in terms of intermediate functions G and H, each having a relatively fewer number of variables, (e.g., B, ..., Z). In one embodiment, the definition may be protected, for example, using masking mechanisms between the function, F(A, B, ..., Z), and intermediate functions, G(B, ..., Z) and H(B, ..., Z), for example, according to equations (18)-(20):

$$F(A,B,\ldots,Z)=G(B,\ldots,Z)\text{XOR}(A \text{ AND } H(B,\ldots,Z)), \quad (18)$$

where, for example:

$$G(B,\ldots,Z)=F(0,B,\ldots,Z); \quad (19)$$

and $$H(B,\ldots,Z)=F(0,B,\ldots,Z)\text{XOR } F(1,B,\ldots,Z) \quad (20)$$

In one embodiment, the relationships, for example, defined by equations (18)-(20) may be protected for fixed values of A, such as, zero (0) and one (1), for example, according to equations (21)-(22).

$$F(0,B,\ldots,Z)=F(0,B,\ldots,Z)\text{XOR}(0 \text{ AND } (F(0,B,\ldots,Z)\text{XOR } F(1,B,\ldots,Z))); \quad (21)$$

and $$F(1,B,\ldots,Z)=F(0,B,\ldots,Z)\text{XOR}(1 \text{ AND } (F(0,B,\ldots,Z)\text{XOR } F(1,B,\ldots,Z)) \quad (22)$$

In one embodiment, when the arbitrary function, F, having M variables, has a protected definition (e.g., in terms of intermediate functions, G and H, having M−1 variables), a process may reiteratively apply the protected definition to the function, F, for protecting definitions thereof having sequentially increasing numbers of variables (e.g., M+1, M+2, ...), for example, with each reiteration of the definition.

Thus, an arbitrary Boolean function, F, having an arbitrary number of variables may be protected.

Reference is made to FIG. 8, which schematically illustrates protected definitions for an arbitrary Boolean function, F, and transformations thereof F'; F*, which may be defined in terms of intermediate functions, G and H, and transformations thereof. G'; G* and H'; H*, respectively, according to an embodiment of the invention.

In some embodiments, arbitrary functions G and H having a number of variables N may be defined in a protected manner, for example, as shown in reference to FIG. 7 and/or according to equations (18)-(20) In one embodiment, the functions G and H may be transformed to G'; G* and H'; H*, respectively, where 6'; G* and H'; H* are likewise defined in a protected manner. Thus, using functions G', G*, H', and H*, functions F' and F* may be defined in a protected manner, for example, as shown in FIG. 8 or according to equations (24) and (25):

$$F'=R \text{ XOR } G'\text{XOR}(A' \text{ AND } H')\text{XOR}(A^* \text{ AND } H^*); \quad (23)$$

and $$F^*=R \text{ XOR } G^*\text{XOR}(A' \text{ AND } H^*)\text{XOR}(A^* \text{ AND } H'), \quad (24)$$

where a variable R 820 may be an additional (e.g., random) value and the functions F' and F* may be transforms of an arbitrary function F, where for example:

$$F=F'\text{XOR } F^*. \quad (25)$$

Reference is made to FIGS. 9 and 10, which schematically illustrate protected definitions of an arbitrary Boolean function, F, having a number of variables (e.g., M) where the definition includes a minimal number of intermediate functions, a and H, having less than the number of variables, M, according to an embodiment of the invention. In some embodiments, an arbitrary Boolean function, F, having a substantially small number of variables (e.g., M), may be defined in terms of intermediate functions G and U (e.g., having M−1 variables), and composite functions thereof (e.g., having M−2, M−3, ... variables).

For example, as shown in FIG. 9, an arbitrary Boolean function, F, 910 having four variables may be represented by two intermediate functions, G and H, 920 each having three variables, which in turn may each be represented by composites of the two intermediate functions, GG, GH, HG and HH, 930 each having two variables, which in turn may each be represented by composites (e.g., or composites of composites) of the two intermediate functions, GGG, GHG, GGH, GHH, HGG, HHG, HGH, and HHH, 940, each having one variable. Such compositions may be reiterated or extended for representing Boolean function, F, having a substantially small number of variables, using a reduced number of functions.

In FIG. 10, an arbitrary Boolean function, F, having a substantially small number of variables (e.g., M variables), may be defined in terms of single variable Boolean functions (e.g., one (1) variable) according to an embodiment of the invention. For example, in the upper row of boxes of FIG. 9 there may be, for example, eight functions, GGG, GHG, GGH, GHH, HGG, HHG, HGH, and HHH, 940, each having one variable. In one embodiment, since there are typically only four unique Boolean functions having one variable, for example, defined by equations (6)-(9), the eight functions 940 in FIG. 9 may be replaced, minimized, or reduced by a distinct one of the four single variable Boolean functions 1040 in FIG. 10.

Embodiments of the invention may be used to protect S-box transformations of DES. Each S-box transformation of DES may be a Boolean vector function, having six inputs and four outputs. According to embodiments of the invention, the number of intermediate functions used to represent arbitrary Boolean functions may be reduced. For example, each S-box transformation may be represented as four Boolean functions with substantially the same set of input variables, for example, as defined by equation (26):

$$S1(A,C,B,D,E,F), \ldots, S4(A,C,B,D,E,F) \qquad (26)$$

In one embodiment, each function having two variables may be reiteratively defined using a connection or path with one of the functions having one variable. Likewise, there are typically only 16 Boolean functions having two variables, which may be used to represent a relatively larger number of intermediate functions.

Reference is made to FIG. 11, which is a flow chart of a method according to an embodiment of the invention. In one embodiment a process may protect an arbitrary Boolean function (e.g., used to process secret data) for an arbitrary number of variables, N (e.g., where N is a natural number), used in a computing device, for example, from side-channel attacks.

In operation 1100, fob the arbitrary Boolean function of N variables, an encryption management system (e.g encryption management system 162 in computing device 130) may determine if N>1. If no, a process may proceed to operation 1110. If yes, a process may proceed to operation 1120.

In operation 1110, an encryption management system (e.g. encryption management system 162 in computing device 130) when N=1, protect one or more definitions of a Boolean function (e.g., the four single variable Boolean functions) by applying a predetermined masking algorithm. In one embodiment, the protected definition, for example, defined by equations (18)-(20), may be protected for fixed values of P, such as, zero (0) and one (1), for example, according to equations (21)-(22).

In operation 1120, when N>1, the encryption management system may reiteratively define the arbitrary Boolean function of number of variables, N, (e.g., A, B, . . . , Z) in terms of intermediate functions, G and H, of a fewer number of variables, N–M, (e.g., B, . . . , Z) where M<N, until N–M=1 (e.g., where M is a natural number). The definition may be protected, for example, using masking mechanisms between the function, P(A, B, . . . , Z), and intermediate functions, G(B, . . . , Z) and H(B, . . . , Z), for example, according to equations (18)-(20), described herein in reference to FIG. 7. The definitions may be reiteratively defined in terms of intermediate functions, G and H, until N–M=1 (e.g., or G and H may be single variable Boolean functions) according to embodiments described, for example, in reference to FIGS. 9 and 10 For example, when M=1.

For example, if N>1, the encryption management system may define the arbitrary Boolean function of number of variables, N, (e.g., A, B, . . . , Z) in terms of two or more single variable functions, C and H. In one embodiment, the encryption management system may reiteratively defining the arbitrary Boolean function of number, N, in terms of functions having N–M variables, where is monotonically increasing. In another embodiment, the encryption management system may define a function path (e.g., as shown in FIGS. 9 and 10) between the arbitrary Boolean function of number of variables, N, (e.g., A, B, . . . , Z) in terms of two or more single variable functions, G and H.

In operation 1130, a processor may apply the predetermined masking algorithm to the two or more intermediate functions, G and H. For example, the arbitrary Boolean functions may be protected, for example, by transforming the function, F, to two functions, F' and F*, for example, as defined by equations (11)-(13), applying further encryption and/or additive or other masking to the functions, using a verification authenticator for preventing unauthorized devices from accessing the functions, storing the functions (e.g., as a group or in parts) in a protected memory or storage space, or other means of protection. The predetermined masking algorithm may include a transformation, additive or other masking, etc., which may be applied to linear (e.g., including using and/or defining another random variable) or non-linear Boolean functions. For example, when the Boolean function is defined in terms of single variable functions, G and H, the processor may apply the predetermined masking algorithm for in operation 1100 (e.g., for the case when N=1) to the two or more intermediate functions, G and H.

In operation 1140, the processor may combine the masked intermediate functions G and H according to a predetermined scheme to generate a masked arbitrary Boolean function of the number of variables, N.

In operation 1150, a memory (e.g., memory controller) may store a combined result of the masked intermediate functions C and H.

Other operations or series of operations may be used.

In some embodiments, a process described herein may be summarized according to the following pseudo-code, for example:

```
Start Protect
    Protect (function F with N variables)
    Inputs: natural N; description of F
    Outputs: description of F' and F*
    If N equals 1 // there are only 4 possibilities
        If F(X) = 0 output F'(X',X*) = X', F*(X',X*) = X'
        If F(X) = 1 output F'(X',X*) = X', F*(X',X*) = NOT X'
        If F(X) = X output F'(X',X*) = X', F*(X',X*) = X*
        If F(X) = NOT X output F'(X',X*) = X', F*(X',X*) = NOT X*
    else // if N > 1
        Represent F using G and H
        Call (recursively) 'Protect' with (G,N–1) and (H,N–1) to
        generate G',G*, H',H*
        output F' = R XOR G' XOR (A' AND H') XOR (A* AND H*)
               F* = R XOR G* XOR (A' AND H*) XOR (A* AND H')
    end
```

Other pseudo-code or combinations thereof may be used.

While the invention has been described with respect to a limited number of embodiments, it will be appreciated that many variations, modifications and other applications of the invention may be made. Embodiments of the present invention may include other apparatuses for performing the operations herein. Such apparatuses may integrate the elements discussed, or may comprise alternative components to carry out the same purpose. It will be appreciated by skilled in the art that the appended claims are intended to cover all such modifications and changes as fall within the true spirit of the invention.

What is claimed is:

1. A method of protecting secret data, which is intended to be processed by an original function, from being deduced by a side-channel attack upon execution of the original function by an electronic computing device,
   the method comprising:
   creating hardware circuitry which replaces the original function with one or more pairs of replacement functions, by applying a predetermined masking algorithm which performs a recursive protection process which comprises:
   (i) receiving as input a description of a Boolean function F of one or more variables, wherein N denotes the number of said one or more variables;
   (ii) generating a pair of replacement functions, denoted F' and F*, wherein, if N equals one, then:
   for the function F which receives as input a single variable, denoted X, defining two additive variables denoted X' and X*
   wherein X' XOR X* equals to X;
   defining the pair of replacement functions F' and F* such that $$F'(X) \text{ XOR } F^*(X) = F(X);$$

wherein, if N is greater than one, then:
   generating a pair of intermediate functions, denoted G and H,
   wherein intermediate function G has N−1 input variables,
   wherein intermediate function H has N−1 input variables,
   wherein the intermediate function G, upon receiving the N−1 input variables, yields the same result as the function F yields upon receiving zero and the N−1 input variables,
   wherein the intermediate function H, upon receiving the N−1 input variables,
   yields the same result as: a result of a XOR operation between (a) the result of the function F upon receiving zero and the N−1 input variables; and (b) the result of the function F upon receiving one and the N−1 input variables;
   recursively applying the protection process to the intermediate function G and its N−1 variables, to generate a pair of replacement functions G' and G*;
   recursively applying the protection process to the intermediate function H and its N−1 variables, to generate a pair of replacement functions H' and H*;
   generating a pair of replacement functions, denoted F' and F*, wherein F' is a function of G' and H' and H* and a random number R, wherein F* is a function of G* and of H' and of H* and the random number R, wherein F=F' XOR F*;
   (iii) combining the replacement functions F' and F* according to a predetermined scheme such that the combined masked function, upon execution by said hardware circuitry in said electronic device, generates the same result of the function F and also protects the input variables of the masked combined function from being deduced by a side-channel attack.

2. The method of claim 1, wherein the function F is of the form F(A, B, . . . , Z),
   wherein the value of F(A, B, . . . , Z) equals to G(B, . . . , Z) XOR (A AND H(B, . . . , Z)),
   wherein the method comprises generating the intermediate functions G and H such that G(B, . . . , Z) equals to F(0, B, . . . , Z)
   and such that
   H(B, . . . , Z) equals to F(0, B, . . . , Z) XOR F(1, B, . . . , Z).

3. The method of claim 2, wherein, if N is greater than one, then step (ii) comprises:
   generating the replacement function F' such that $$F'=R \text{ XOR } G' \text{ XOR}(A' \text{ AND } H') \text{XOR}(A^* \text{ AND } H^*);$$

generating the replacement function F* such that $$F^*=R \text{ XOR } G^* \text{XOR}(A' \text{ AND } H^*) \text{XOR}(A^* \text{ AND } H');$$

wherein A equals to A' XOR A*.

4. The method of claim 1, wherein the original function comprises four variables, wherein the method comprises:
   replacing the original function with a pair of first-level replacement functions, each one of such first-level replacement functions operating on three of the four variables;
   replacing each one of the first-level replacement functions with a pair of second-level replacement functions, each one of such second-level replacement functions operating on two of the three variables;
   replacing each one of the second-level replacement functions with a pair of third-level replacement functions, each one of such third-level replacement functions operating on one of the two variables.

5. The method of claim 1, wherein the original function comprises a Boolean vector function utilized in Substitute-Box (S-Box) transformation in Data Encryption Standard (DES), wherein the method comprises protecting secret data processed by the S-Box.

6. The method of claim 1, comprising:
   protecting secret data of a plurality of different original functions,
   wherein each original function includes two or more variables,
   by using combinations of not more than four different single-variable intermediate functions.

7. The method of claim 1, comprising:
   protecting secret data of a plurality of different original functions,
   wherein each original functions includes three or more variables,
   by using combinations of not more than sixteen different dual-variable intermediate functions.

8. The method of claim 1, comprising:
   protecting secret data of a first original function; and
   protecting secret data of a second original function by utilizing at least one intermediate function used in the protecting of the secret data of the first original function.

9. An apparatus for protecting secret data, which is intended to be processed by an original function, from being deduced by a side-channel attack upon execution of the original function by an electronic computing device, wherein the apparatus comprises:
   the electronic computing device having hardware circuitry which is created by a method which replaces the original function with one or more pairs of replacement functions, by applying a pre-defined masking algorithm which performs a recursive protection process which comprises:

13

(i) receiving as input a description of a Boolean function F of one or more variables, wherein N denotes the number of said one or more variables;
(ii) generating a pair of replacement functions, denoted F' and F*,
wherein, if N equals one, then:
for the function F which receives as input a single variable, denoted X,
defining two additive variables denoted X' and X* wherein X' XOR X* equals to X;
defining the pair of replacement functions F' and F* such that $$F'(X) \text{ XOR } F^*(X) = F(X);$$

wherein, if N is greater than one, then:
  generating a pair of intermediate functions, denoted G and H,
  wherein intermediate function G has N−1 input variables,
  wherein intermediate function H has N−1 input variables,
  wherein the intermediate function G, upon receiving the N−1 input variables, yields the same result as the function F yields upon receiving zero and the N−1 input variables;
  wherein the intermediate function H, upon receiving the N−1 input variables, yields the same result as: a result of a XOR operation between (a) the result of the function F upon receiving zero and the N−1 input variables; and (b) the result of the function F upon receiving one and the N−1 input variables;
  recursively applying the protection process to the intermediate function G and its N−1 variables, to generate a pair of replacement functions G' and G*;
  recursively applying the protection process to the intermediate function H and its N−1 variables, to generate a pair of replacement functions H' and H*;
  generating, without utilizing a lookup table, a pair of replacement functions, denoted F' and F*, wherein F' is a function of G' and H' and H* and a random number R, wherein F* is a function of G* and of H' and of H* and the random number R, wherein F=F' XOR F*;
(iii) combining the replacement functions F' and F* according to a predetermined scheme such that the combined masked function, upon execution by said hardware circuitry in said electronic computing device, generates the same result of the function F and also protects the input variables of the masked combined function from being deduced by a side-channel attack.

14

10. The apparatus of claim 9, wherein the function F is of the form F(A, B, ..., Z),
  wherein the value of F(A, B, ..., Z) equals to G(B, ..., Z) XOR (A AND H(B, ..., Z)),
  wherein the method comprises generating the intermediate functions G and H
    such that G(B, ..., Z) equals to F(0, B, ..., Z)
    and such that H(B, ..., Z) equals to F(0, B, ..., Z) XOR F(1, B, ..., Z).

11. The apparatus of claim 10, wherein, if N is greater than one, then step (ii) comprises:
  generating the replacement function F' such that $$F' = R \text{ XOR } G' \text{ XOR}(A' \text{ AND } H') \text{XOR}(A^* \text{ AND } H^*);$$

generating the replacement function F* such that $$F^* = R \text{ XOR } G^* \text{XOR}(A' \text{ AND } H^*) \text{XOR}(A^* \text{ AND } H');$$

wherein A equals to A' XOR A*.

12. The apparatus of claim 9, wherein the original function comprises four variables, wherein the method of creating the hardware circuitry comprises:
  replacing the original function with a pair of first-level replacement functions, each one of such first-level replacement functions operating on three of the four variables;
  replacing each one of the first-level replacement functions with a pair of second-level replacement functions, each one of such second-level replacement functions operating on two of the three variables;
  replacing each one of the second-level replacement functions with a pair of third-level replacement functions, each one of such third-level replacement functions operating on one of the two variables.

13. The apparatus of claim 9, wherein the original function comprises a Boolean vector function utilized in Substitute-Box (S-Box) transformation in Data Encryption Standard (DES), wherein the apparatus is to protect secret data processed by the S-Box.

14. The apparatus of claim 9, wherein the hardware circuitry is arranged to protect secret data of a plurality of different original functions,
  wherein each original function includes two or more variables,
  using combinations of not more than four different single-variable intermediate functions.

15. The apparatus of claim 9, wherein the hardware circuitry is arranged to protect secret data of a plurality of different original functions,
  wherein each original functions includes three or more variables,
  using combinations of not more than sixteen different dual-variable intermediate functions.

\* \* \* \* \*